United States Patent [19]

Pichler et al.

[11] Patent Number: 4,856,181
[45] Date of Patent: Aug. 15, 1989

[54] METHOD FOR MANUFACTURING TERMINAL CONTACTS FOR THIN-FILM MAGNETIC HEADS

[75] Inventors: Alfred Pichler, Maisach; Joachim Hertrampf, Munich; Horst Pachonik, Taufkirchen, all of Fed. Rep. of Germany

[73] Assignee: Simens Aktiengesellschaft, Berlin and Munich, Fed. Rep. of Germany

[21] Appl. No.: 240,065

[22] Filed: Aug. 26, 1988

[30] Foreign Application Priority Data

Sep. 24, 1987 [DE] Fed. Rep. of Germany ....... 3732193

[51] Int. Cl.⁴ .............................................. G11B 5/42
[52] U.S. Cl. ................................... 29/603; 156/659.1; 360/103; 360/123
[58] Field of Search .......... 29/603; 360/103, 119–122, 360/123; 156/643, 659.1

[56] References Cited

U.S. PATENT DOCUMENTS

| 4,219,853 | 8/1980 | Albert et al. | 29/603 X |
| 4,613,404 | 9/1986 | Tabei | 156/643 |
| 4,614,563 | 9/1986 | Kubo | 156/643 |
| 4,624,048 | 11/1986 | Hinkel et al. | 29/603 |

FOREIGN PATENT DOCUMENTS 3132452  2/1983  Fed. Rep. of Germany .

Primary Examiner—Carl E. Hall
Attorney, Agent, or Firm—Hill, Van Santen, Steadman & Simpson

[57] ABSTRACT

Method for manufacturing terminal contacts for thin-film magnetic heads. The method of manufacturing reinforced terminal contacts for thin-film magnetic heads provides a photolithographic process sequence that allows the technical requirements to be kept as low as possible and that reduces the gold consumption to a minimum. To that end, a copper layer for contact reinforcement fashioned as a tower is electrodeposited in contact windows formed by a photoresistive layer, which is electrodeposited onto an electrically conductive permalloy layer of a substrate before this is completely structured and has been provided with a protective aluminum oxide layer. A gold film required for the attachment of a bonding wire is finally deposited either directly preceding the protection or following the application of the aluminum oxide on the copper layer.

4 Claims, 3 Drawing Sheets

METHOD FOR MANUFACTURING TERMINAL CONTACTS FOR THIN-FILM MAGNETIC HEADS

BACKGROUND OF THE INVENTION

The present invention is directed to a method for manufacturing terminal contacts for thin-film magnetic heads on a substrate that is subdivided into individual substrate elements each having two write/read heads. The substrate surface is covered surface-wide with an electrically conductive permalloy layer that at least has a plurality of contact locations with contact lugs directed toward the magnetic head. The permalloy layer is structured by ion beam etching using a metallic mask. The structured permalloy layer is covered surface-wide with a protective aluminum oxide layer except for the contact locations that are provided for the attachment of a bonding wire to an electrodeposited gold film.

The manufacture of reinforced terminal contacts such as, for example, contacting interconnects on micro-chips in integrated circuit technology, is a technological process step that is most practically, directly incorporated into an entire manufacturing process of an integrated electronic module. This contacting process, however, frequently has a disadvantage which is related to bonding techniques. The contact spacings are widened for the intended terminal contacts because the distance between the contacts is too small and the contacts must be formed with a reinforcement at the same time. This situation also occurs in thin-film magnetic head technology. Therein, windows are let into a relatively thick layer applied to a substrate and serve as a mask. These windows define the locations for reinforced contact locations at the ends of a plurality of contact lugs of the magnetic heads. The technological process for the manufacture of such thin-film magnetic heads should therefore be designed such that the magnetic heads can be simply contacted or provided with a bonding wire so that they can also be tested. Moreover, the technological requirements for the photolithic manufacture of the reinforced terminal contacts should be only insignificantly increased due to additionally required process steps.

Thus, a method for the manufacture of thin-film magnetic heads is feasible wherein contact windows are let into an approximately 50 μm thick protection layer of aluminum oxide with a chemically soluble space-holder at the end of the photolithographic process. After the contact window has been laid bare in the protective layer, the exposed contact surface is gold-plated. To that end, a gold cover layer is electrodeposited surface-wide onto the substrate. Before bonding, the gold cover layer is again removed in the area of the contact surface that has been laid bare and gold-plated and a bonding needle with a bonding wire is subsequently positioned into the contact window. The critical disadvantages of the described method also lie therein. First, the surface-wide application of the gold coat is uneconomical since it is only required in punctiform fashion and, second, the adjustment of the bonding wire into excessively small contact windows is difficult. This is difficult because the wall of the contact window may be contacted during adjustment resulting in an increase in the risk of failure of the thin-film magnetic heads.

SUMMARY OF THE INVENTION

It is therefore an object of the present invention to provide a method of the type initially cited wherein terminal contacts for thin-film magnetic heads can be manufactured without the stated problems occurring during bonding, without the technological requirement for process steps for the manufacture of the terminal contacts increasing and without the application of the gold coat becoming uneconomical.

In the method initially set forth, this object of the present invention is achieved by the features set forth in the method of the present invention.

In a first embodiment the method has the steps of applying a photoresistive layer onto the masked, electrically conductive permalloy layer and letting into the photoresistive layer at the contact locations by an exposure envelope process contact windows that lay the electrically conductive permalloy layer bare, electrode-positing, a copper layer fashioned as a half-tower onto the exposed permalloy layer, the layer thickness of the copper layer being smaller than that of the photoresistive layer; electrodepositing the gold film onto the cooper layer fashioned as a half-tower and the gold film being provided with a masking for protection from the ion beam etching; removing the residues of the photoresistive layer on the electrically conductive permalloy layer and the permalloy layer being subsequently structured; initially applying surface-wide the protective aluminum oxide layer onto the structure permalloy layer including the masking and being subsequently eroding again to such an extent by mechanical working for the attachment of the bonding wire to the gold film until the masking is laid free and can be removed.

In an alternative embodiment, the method has the steps of applying a photoresistive layer onto the masked, electrically conductive permalloy layer and letting into the photoresistive layer at contact locations by an exposure and development process contact windows that lay the electrically conductive permalloy layer bare; electrodepositing a copper layer fashioned as a full tower onto the exposed permalloy layer, the layer thickness of the copper layer being smaller than that of the photoresistive layer; removing residues of the photoresistive layer on the electrically conductive permalloy layer and the permalloy layer being subsequently structured; initially applying surface-wide the protective aluminum oxide layer onto the structured permalloy layer including the copper layer fashioned as a full tower and being subsequently eroded to such an extent by mechanical processing until remaining residues of the protective layer form a flush surface with the copper layer; cleaning the flush surface and forming the gold film thereon at the contact locations.

Both solutions are particularly useful in that the manufacture of the terminal contacts of thin-film magnetic heads on individual substrate elements of a substrate wafer begins, in terms of the process execution, before a last structuring process for the magnetic heads; i.e., when the electrically conductive permalloy is still present surface-wide and a metallic mask has already been completely structured. In this condition, i.e. before the production of the magnetic head, the substrate receives a masking for galvanic contact reinforcements as well as a bondable surface coat.

In the solution disclosed in the first embodiment, a copper layer fashioned as a half tower is introduced into the individual contact window for contact reinforcement. It is thereby especially advantageous that the contact structure can be manufactured in a continuous work sequence in the thin-film line without interruption by lapping processes. For the solution disclosed in the alternative embodiment, by contrast, full towers are introduced into the contact windows. Additional technological process steps are in fact required. For example, the substrate is cleaned during the contacting phase following the lapping process and is provided with a metallic carrier layer as a galvanic foundation for the bondable surface coat. Another possibility of manufacturing the bondable surface coat is by chemically applying the coat onto the copper layer immediately after the cleaning. Alternatively, it is an advantage of these latter solutions that the lapping process need not be that precisely executed for partial erosion of the protective aluminum oxide layer as is required in the first embodiment. In the first embodiment, a gold film is applied to the copper layer before lapping. Tolerance conditions result for the lapping process that are extremely difficult to observe. The gold film must not be damaged during lapping. A flush lapped surface is therefore seldom achieved. As a result, the bonding needle can contact the remaining wall of the contact window during bonding for extremely small contact windows. The size of the contact window, on the other hand, is critically dependent on the integration area still available for the contact reinforcements of thin-film magnetic heads. Contact reinforcements in the form of half towers can therefore be utilized only to a limited degree. Both of the solutions presented above are therefore alternatives dependent on the boundary conditions of the specific application and serve the purpose of increasing the yield.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
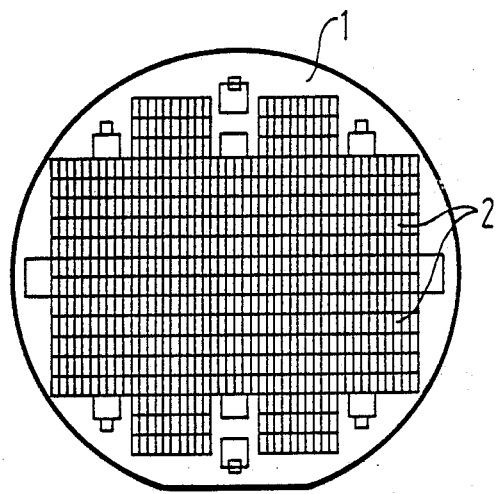
FIG. 1 is a plan view of an exemplary, structured substrate wafer divided into substrate elements.
Figure 2:
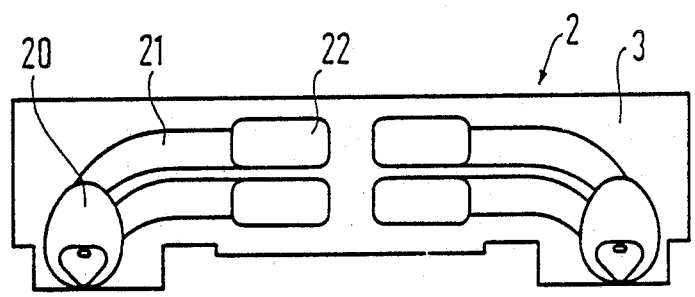
FIG. 2 is a plan view of the fundamental structure of an individual substrate element having two respective terminal contacts for a thin-film magnetic head.

FIG. 1 schematically shows a substrate wafer 1 having a plurality of individual substrate elements 2 whose fundamental structure is shown magnified in FIG. 2. Each substrate element contains two magnetic heads 20 arranged on an integration area 3. A pair of contact lugs 21 is connected to the magnetic heads that are symmetrically arranged relative to the vertical axis of the substrate element. These contact lugs 21 proceed in pairs in parallel and are respectively aligned in the direction toward the center of the substrate element. Every contact lug 21 has a contact reinforcement 22 at its free end. Instead of only two contact lugs per magnetic head, as shown in FIG. 2, however, magnetic heads can also have three contact lugs. In this case, the width of the contact windows and, ultimately, that of the contact reinforcements must be necessarily reduced for an unaltered integration area.

Figure 3:
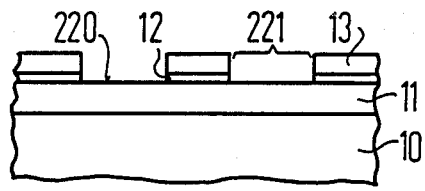
FIGS. 3 through 7 are cross-sectional views of the exemplary, photolithographic manufacture of reinforced half-tower contacts on a substrate provided with a permalloy layer being shown in successive steps; and, FIGS. 8 through 11 are cross-sectional views of the exemplary, photolithographic manufacture of reinforced full-tower terminal contacts on a substrate provided with a permalloy layer, being shown in terms of its critical steps.

Two exemplary embodiments for photolithographic manufacture of reinforced terminal contacts for thin-film magnetic heads on a substrate 10 shall be set forth. As shown in FIG. 3, both embodiments are based on an electrically conductive permalloy layer 11 being already electrodeposited surface-wide onto the substrate. A metallic mask 12 that is necessary for structuring the permalloy layer has also been manufactured. In this condition, the photolitographic process for manufacturing the magnetic heads is interrupted since the reinforced terminal contacts must first be electrolytically constructed. To that end, an approximately 50 μm thick photo foil 13 is applied onto the permalloy layer 11 and onto the metallic mask 12, this photo foil 13 being in turn removed at contact locations 220 for the contact reinforcements 22 with an exposure and development process. In this way, contact windows 221 that lay bare the permalloy layer 11 are generated wherein the contact reinforcements are formed.

Figure 4:
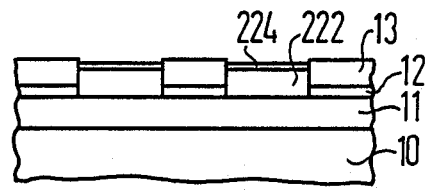

In the first exemplary embodiment, a copper layer 222 is first electrolytically introduced into the contact window 221, as shown in FIG. 4. The layer thickness of this copper layer 222 is smaller than that of the photo foil 13; this metallic foundation of the later contact reinforcement is therefore referred to as "half-tower". A gold film 224 is electrodeposited immediately on this copper layer, this gold film 224 later forming the bondable surface coat of the contact reinforcement. FIG. 4 clearly shows that the entire height of the contact reinforcement 22 composed of the copper layer 222 and of the gold film 224 is selected such that the photo foil 13 still projects beyond it. The photo foil 13 is subsequently removed.

Figure 5:
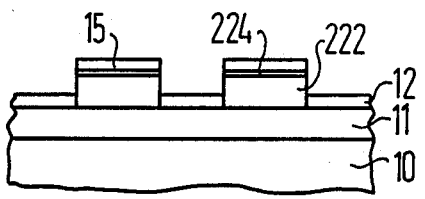

The contact reinforcement 22 is thus finished to such an extent that the electrically conductive permalloy layer 11 can now be structured. As shown in FIG. 5, however, the sensitive surface of the contact location must first be protected. A protective masking 15 is therefore applied onto the gold film 224. The protective masking 15 is selected in accordance with the selectivity, i.e. the ratio of the etching rates for the material of the protective masking 15 and for the material of the metallic mask 12. In other words, a residual layer thickness of the protective masking 15 must still always be preserved after the structuring of the permalloy layer with ion beam etching, this residual layer thickness not only preventing the gold film 224 from being etched off but also preventing metallic etching residues from depositing thereon. The processes when structuring the electrically conductive permalloy layer shall not be set forth here in detail and are likewise not shown in detail in the drawing for reasons of simplification. These processes are at the specific command of a person skilled in the art in the field of thin-film magnetic head technology and do not form part of the subject matter of the present invention.

Figure 6:
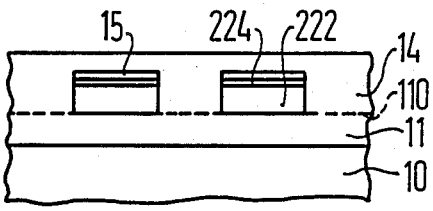

The surface structure 110 of the structured permalloy layer 11 is only schematically indicated in FIG. 6. After the conclusion of the ion beam etching, this structured permalloy layer 11 including the protective masking 15 are protected, i.e. a protective aluminum oxide layer 14 is applied surface-wide. FIG. 6 shows this condition.

Figure 7:
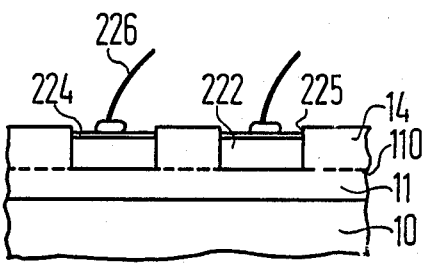

The contact reinforcements 22 must now be laid bare. This is done by surface-wide lapping of the substrate surface. Since the metallic etching residues have been locally chemically bonded with the aluminum oxide of the protection, these residues are also eroded in this lapping process together with the surface of the protective masking 15. However, the protective masking 15 must not be completely eroded during lapping since the surface of the gold film 224 could be damaged and would then have to be reformed. On the other hand, the protective aluminum oxide layer 14 should ideally be eroded to such an extent that it is nearly flush with the surface of the gold film 224. High demands must therefore be made of the precision of the lapping process; nonetheless, contact windows necessarily remain after the protective masking 15 has also been chemically stripped. This condition is shown in FIG. 7. A remaining lapping edge 225 can be clearly seen therein, this complicating the contacting of a bonding wire 226 during later bonding. This is particularly true for a high integration density wherein only a small area is available for the contact location 22 for geometric reasons. This shows that the actual contacting of the bonding wire 226 is a technologically complex manufacturing step. It is therefore expedient to test the finished magnetic heads on the substrate before it is divided so that for a potentially high reject rate the wafer would not even have to be divided and superfluous contacting of faulty magnetic heads can be immediately avoided.

Figure 8:
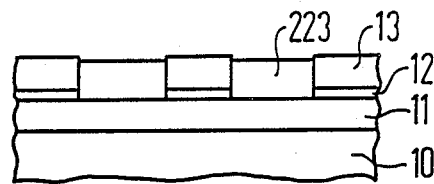

It follows from the above description of the first exemplary embodiment that the projecting lapping edges 225 can present difficulties in the later step of connecting the bonding wire 226 that, for extremely small contact windows, even make this manufacturing method for contact reinforcement 22 uneconomical. In the second exemplary embodiment set forth below with reference to FIGS. 8 through 11, a structure of the contact reinforcement 22 results wherein these difficulties do not occur. However, the manufacturing sequence is more complex. This second embodiment also begins with a structure of the type shown in FIG. 3. FIG. 8 then shows that a copper layer 223 is first introduced into the contact window 221, the layer thickness of this copper layer 223 being dimensioned such that it does not project beyond the surface of the photoresistive layer 13 but is nearly flush therewith. In contrast to the first exemplary embodiment set forth above, the copper layer 223 is therefore referred to here as a "full tower". The photo foil 13 is stripped following this process step. The metallic mask 12 is thus laid bare, so that the permalloy layer 11 can be structured with ion beam etching in as is known in the prior art. It is also to be thereby noted that the metallic mask 12 is removed during the course of this structuring process and the copper layer 223 is thereby also attacked in the ratio of its selectivity to the metallic mask. This partial erosion of the copper layer 223 during the structuring process must also be taken into consideration in the prior build-up of the copper layer 223.

Figure 9:
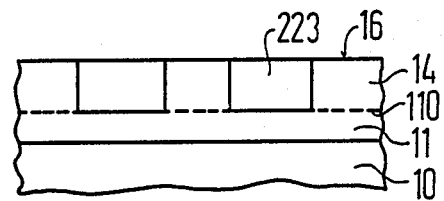

FIG. 9 again schematically shows the surface structure 110 of the finished, structured, electrically conductive permalloy layer 11. After the structuring process of the permalloy layer 11, the entire substrate surface is then again protected, i.e. is covered surface-wide with the protective aluminum oxide layer 14. Here, too, a lapping process follows in order to lay the contact reinforcements bare. In this case, however, the partial erosion of the protective aluminum oxide layer is significantly less difficult. The lapping process is executed to such an extent that a flush lapped surface 16 results in which the copper layer 223 of the contact reinforcement 22 is laid bare. FIG. 9 shows this condition.

Figure 10:
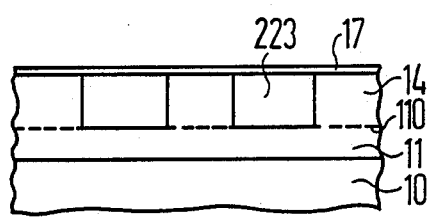

As shown in FIG. 10, a metallic carrier layer 17 is applied surface-wide onto this lapped surface 16. In contrast to the first exemplary embodiment set forth above, this carrier layer is necessary since all contact locations are no longer electrically connected to one another following the structuring of the electrically conductive permalloy layer and the gold film 224 can therefore not be directly electrodeposited on the copper layer 223.

Figure 11:
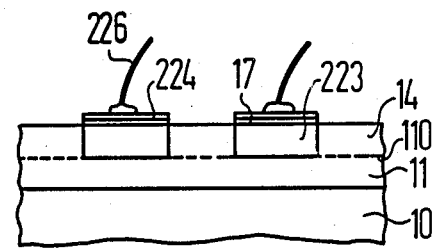

After finishing the bondable surfaces of the contact reinforcement 22 by depositing the gold film 224, the thin-film magnetic heads together with their contact locations are now finished. As in the preceding exemplary embodiment, the substrates that have not yet been divided can be initially tested in order to forego the division of the individual substrate elements 2 and to forego the contacting to a bonding wire 225 for an excessively high reject rate. The individual substrate element 2 are then divided only for substrates deemed good and the detached magnetic heads are finished by contacting the bonding wire 226. The structure of the finished magnetic head is schematically shown in FIG. 11. It is thereby shown that, by contrast to the first exemplary embodiment set forth above, the contact reinforcements here project beyond the surface of the protective aluminum oxide layer 14, so that the bonding is significantly less difficult for a small geometrical surface.

In comparison to conventional technology, both methods set forth in the two exemplary embodiments have the advantage that the manufacture of reinforced terminal contacts for thin-film magnetic heads begins at a point in time at which these thin-film magnetic heads are not yet completed. The manufacture of the terminal contact thus occurs during the manufacturing phase of the magnetic heads. The unprotected and still unstructured, electrically conductive permalloy layer is thereby exploited in both instances, as set forth. This provides advantages in that a low gold consumption can be recorded in both instances; in that the number of photolithographic process steps is lower in the case of the half-tower solution; and in that the wall of the contact windows is not contacted during bonding in the case of the full-tower solution as well as in the case of the half-tower solution, with certain restrictions.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for manufacturing terminal contacts for thin-film magnetic heads on a substrate that is subdivided into individual substrate elements each having two write/read heads, whereby a surface of the substrate is covered surface-wide with an electrically conductive permalloy layer that at least has a plurality of contact locations with respective contact lugs directed toward respective magnetic heads and being structured by ion beam etching using a metallic mask, and whereby the resulting structured permalloy layer is covered surface-wide with a protective aluminum oxide layer except for the contact locations that are provided for the attachment of a bonding wire to an electrodeposited gold film, the method comprising the steps of: applying a photoresistive layer onto the masked, electrically conductive permalloy layer and letting into the photoresistive layer at the contact locations by an exposure envelope process to form contact windows that lay the electrically conductive permalloy layer bare; electrodepositing a copper layer fashioned as a half-tower onto the exposed permalloy layer, the layer thickness of the copper layer being smaller than that of the photoresistive layer; electrodepositing the gold film onto said copper layer fashioned as a half-tower and the gold film being provided with a masking for protection from the ion beam etching; removing residues of the photoresistive layer on the electrically conductive permalloy layer and the permalloy layer being subsequently structured; initially applying surface-wide the protective aluminum oxide layer onto the structured permalloy layer including the masking and subsequently eroding said aluminum oxide layer to such an extent by mechanical working that until the masking is laid free and can be removed and a bonding wire can be attached to the gold film.

2. A method for manufacturing reinforced terminal contacts for thin film magnetic heads on a substrate that is subdivided into individual substrate elements each having two write/read heads, whereby a surface of the substrate is covered surface-wide with an electrically conductive permalloy layer that at least has a plurality of contact locations each having respective contact lugs directed toward respective magnetic heads and being structured by ion beam etching using a metallic mask, and whereby the resulting structured permalloy layer is covered surface-wide with a protective aluminum oxide layer except for the contact layers that are provided for the attachment of a bonding wire to a gold film, the method comprising the steps of: applying a photoresistive layer onto the masked, electrically conductive permalloy layer and letting into the photoresistive layer at the contact locations by an exposure and development process to form contact windows that lay the electrically conductive permalloy layer bare; electrodepositing a copper layer fashioned as a full-tower onto the exposed permalloy layer, the layer thickness of the copper layer being smaller than that of the photoresistive layer; removing residues of the photoresistive layer on the electrically conductive permalloy layer and the permalloy layer being subsequently structured; initially applying surface-wide the protective aluminum oxide layer onto the structured permalloy layer including the copper layer fashioned as a full-tower and subsequently eroding said aluminum oxide layer to such an extent by mechanical processing until remaining residues of the protective layer form a flush surface with the copper layer; cleaning the flush surface and forming the gold film thereon at the contact locations.

3. The method according to claim 2, wherein the gold film is applied by chemical deposition.

4. The method according to claim 2, wherein the flush surface is covered surface-wide with a metallic carrier later, the gold film being electrodeposited on this metallic carrier layer at the contact locations for the attachment of the bonding wire and those parts of the metallic carrier layer that are not gold-plated being in turn removed.

* * * * *